UNITED STATES PATENT OFFICE.

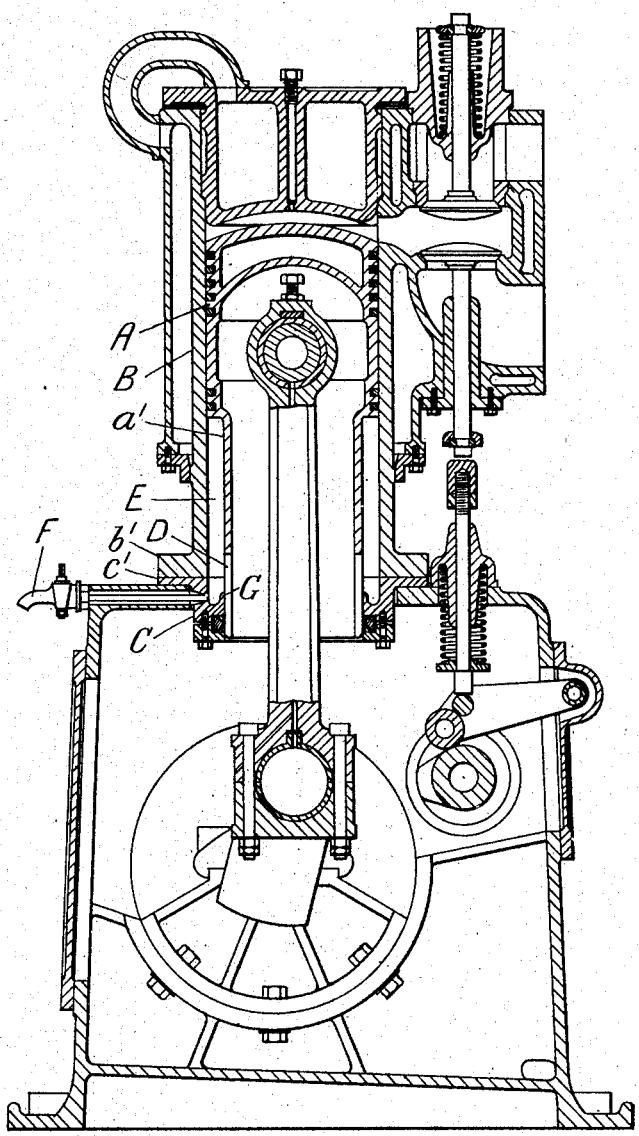

FREDERICK GEORGE HATCH, OF GLASGOW, SCOTLAND, ASSIGNOR TO THE ANDERSTON FOUNDRY COMPANY LIMITED, OF GLASGOW, SCOTLAND.

INTERNAL-COMBUSTION ENGINE.

945,233.  Specification of Letters Patent.  Patented Jan. 4, 1910.

Application filed May 12, 1909. Serial No. 495,511.

*To all whom it may concern:*

Be it known that I, FREDERICK GEORGE HATCH, a subject of the King of the United Kingdom of Great Britain and Ireland, and residing at Glasgow, Scotland, have invented a certain new and useful Improvement in Internal-Combustion Engines, of which the following is a specification.

This invention relates to vertical internal combustion engines and is particularly applicable to high speed, short stroke engines of the kind in which a piston of less diameter at its lower end than the cylinder forms in conjunction with a guide ring at one end of the cylinder a chamber wherein air or other gas may be compressed and utilized for various purposes.

The invention consists in attaching to the bed of the engine and beneath the cylinder flange a guide ring in which the piston works, which ring is so disposed that it does not materially increase the height of the engine.

The invention is illustrated in the accompanying drawing which shows a vertical internal combustion engine fitted with the improvement.

As shown in the drawing, the trunk piston A which at the open or forward end is of less diameter than the cylinder B is of such length that it always projects into and works in the guide ring C. The part $a^1$ of the piston which is of smaller diameter is of plain cylindrical form and has slots D formed in its open end for the connecting rod to clear. By altering the length of these slots D the degree of compression to be obtained in the chamber E can be varied as may be necessary. The ring C is formed with a flange $c^1$ of suitable size and shape to bolt on to the bed of the engine beneath the flange $b^1$ or lower end of the engine cylinder and may be held by the same bolts as hold down the said cylinder. The ring C can be arranged to project into the bed as shown and may have on its upper side a recess or cavity, turned or otherwise formed, of the same diameter as the working cylinder. The lower part of the ring C is formed to fit the smaller diameter of the piston and is provided with two or more loose rings or junk rings to carry packing rings of any known form to make a tight joint and prevent the compressed gas or air from leaking into the bed, as usual. These packing rings will also prevent the oil which is used to lubricate the working parts in the bed from finding its way into the working cylinder of the engine, so that separate and suitable lubricants may be used in the cylinder and in the bed of the engine.

Relief cocks F may be provided so that the compression in the chamber E may be released when the engine is turned by hand for any reason, or when the engine is to be started. These cocks F may be so arranged that any waste oil from the lubrication of the cylinder may be blown out of the chamber E into suitable receptacles. If it is desired to catch and retain the oil which comes from the cylinder, a ridge or bead G is formed in the recessed part of the ring to form a space in which the oil will collect to be removed by means of the relief or other cocks as may be provided. If it is not desired to catch and retain this oil, the ridge may be omitted, in which case the oil will pass to the bed through the slots D in the guide trunk of the piston.

Having now described my invention what I claim and desire to secure by Letters Patent of the United States is:—

1. In a vertical internal combustion engine, in combination, a cylinder having the lower end open, a trunk piston movable in said cylinder, the lower end of said piston being of less diameter than the cylinder, a bed for said engine, and a guide ring for the lower end of said piston, said guide ring formed with a flange interposed between the lower end of the cylinder and the upper face of said bed.

2. In a vertical internal combustion engine, in combination, a cylinder having the lower end open, a trunk piston movable in said cylinder, the lower end of said piston being of less diameter than the cylinder, a bed for said engine, a guide ring for the lower end of said piston, said guide ring projecting into the bed and formed with a flange interposed between the lower end of the cylinder and the upper face of said bed.

In testimony whereof I have signed my name to this specification in the presence of two subscribing witnesses.

FREDERICK GEORGE HATCH.

Witnesses:
 WALLACE CRANSTON FAIRWEATHER,
 JOHN MCCLEARY.